(12) United States Patent
Cowgill et al.

(10) Patent No.: US 9,169,789 B2
(45) Date of Patent: Oct. 27, 2015

(54) SYSTEM AND METHOD FOR ADJUSTING FUEL MASS FOR MINIMUM FUEL INJECTOR PULSE WIDTHS IN MULTIPLE FUEL SYSTEM ENGINES

(75) Inventors: Joshua Cowgill, Hartland, MI (US); Ben W. Moscherosch, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 872 days.

(21) Appl. No.: 13/324,532

(22) Filed: Dec. 13, 2011

(65) Prior Publication Data

US 2013/0046454 A1    Feb. 21, 2013

Related U.S. Application Data

(60) Provisional application No. 61/523,677, filed on Aug. 15, 2011.

(51) Int. Cl.
*F02D 28/00* (2006.01)
*F02D 19/06* (2006.01)
(Continued)

(52) U.S. Cl.
CPC .......... *F02D 19/0647* (2013.01); *F02D 19/024* (2013.01); *F02D 19/081* (2013.01); *F02D 41/0025* (2013.01); *F02D 41/30* (2013.01); *F02B 1/12* (2013.01); *F02D 19/0644* (2013.01);
(Continued)

(58) Field of Classification Search
CPC .............. F02D 19/0628; F02D 19/081; F02D 41/3064; F02D 19/0697; F02D 19/0689; F02D 19/0694; F02D 2200/0602; F02D 19/0647; F02D 41/0025; F02D 41/3094; F02D 19/061; F02D 19/0692; F02D 41/266; F02D 2400/11; F02D 19/0618; F02D 19/066; F02D 19/0615; F02D 2041/389; F02D 19/0623; F02B 2075/125; F02B 2275/16; Y02T 10/123; Y02T 10/36
USPC ......... 123/525, 431, 575, 577, 1 A, 299, 526, 123/304; 701/104
See application file for complete search history.

(56) References Cited

U.S. PATENT DOCUMENTS 4,700,672 A * 10/1987 Baguena ........................ 123/299
5,140,959 A *  8/1992 Durbin .......................... 123/304
(Continued)

FOREIGN PATENT DOCUMENTS

CN        1648429 A      8/2005
CN      101057067 A     10/2007
(Continued)

OTHER PUBLICATIONS

Machine translation of 102007025076 , Potts, Dec. 2008.*
(Continued)

*Primary Examiner* — Lindsay Low
*Assistant Examiner* — John Bailey

(57) ABSTRACT

A control system for an engine includes a fuel mass determination module, a mass fraction determination module, and a fuel injector control module. The fuel mass determination module determines a first minimum fuel mass corresponding to a first fuel system of the engine. The mass fraction determination module determines first minimum and maximum mass fractions based on the first minimum fuel mass and a total fuel mass. The fuel injector control module limits a first desired mass fraction based on the first minimum and maximum mass fractions, and controls a first fuel injector of the engine based on the limited first desired mass fraction.

20 Claims, 3 Drawing Sheets

(51) Int. Cl.
*F02D 41/30* (2006.01)
*F02D 41/00* (2006.01)
*F02D 19/02* (2006.01)
*F02D 19/08* (2006.01)
*F02D 41/18* (2006.01)
*F02B 1/12* (2006.01)

(52) U.S. Cl.
CPC ............ *F02D41/0027* (2013.01); *F02D 41/18* (2013.01); *Y02T 10/32* (2013.01); *Y02T 10/36* (2013.01)

(56) References Cited

U.S. PATENT DOCUMENTS

| | | | |
|---|---|---|---|
| 5,379,740 A * | 1/1995 | Moore et al. | 123/478 |
| 5,540,205 A * | 7/1996 | Davis et al. | 123/486 |
| 5,771,857 A * | 6/1998 | Willi | 123/305 |
| 5,890,459 A * | 4/1999 | Hedrick et al. | 123/27 GE |
| 5,941,210 A * | 8/1999 | Hill et al. | 123/305 |
| 6,230,683 B1 * | 5/2001 | zur Loye et al. | 123/435 |
| 6,276,334 B1 * | 8/2001 | Flynn et al. | 123/435 |
| 6,276,347 B1 * | 8/2001 | Hunt | 123/549 |
| 6,286,482 B1 * | 9/2001 | Flynn et al. | 123/435 |
| 6,336,528 B1 * | 1/2002 | Touchette et al. | 239/408 |
| 6,554,091 B2 * | 4/2003 | Mianzo et al. | 180/197 |
| 6,561,157 B2 * | 5/2003 | zur Loye et al. | 123/295 |
| 6,694,242 B2 * | 2/2004 | Wong | 701/104 |
| 6,722,342 B2 * | 4/2004 | Ogawa et al. | 123/305 |
| 6,910,449 B2 | 6/2005 | Strom et al. | |
| 6,915,776 B2 * | 7/2005 | zur Loye et al. | 123/304 |
| 6,988,490 B2 | 1/2006 | Satou | |
| 7,000,596 B2 * | 2/2006 | Zurloye et al. | 123/435 |
| 7,055,506 B2 * | 6/2006 | Kaiser et al. | 123/527 |
| 7,162,995 B2 * | 1/2007 | Munshi | 123/305 |
| 7,201,146 B2 | 4/2007 | Araki | |
| 7,222,015 B2 * | 5/2007 | Davis et al. | 701/103 |
| 7,225,787 B2 * | 6/2007 | Bromberg et al. | 123/198 A |
| 7,314,033 B2 * | 1/2008 | Cohn et al. | 123/198 A |
| 7,377,267 B2 * | 5/2008 | Boyer et al. | 123/527 |
| 7,438,238 B2 * | 10/2008 | Date et al. | 239/96 |
| 7,451,942 B2 * | 11/2008 | Borissov | 239/533.12 |
| 7,461,633 B2 * | 12/2008 | Vangraefschepe et al. | 123/434 |
| 7,463,967 B2 * | 12/2008 | Ancimer et al. | 701/104 |
| 7,509,209 B2 * | 3/2009 | Davis et al. | 701/103 |
| 7,546,834 B1 * | 6/2009 | Ulrey et al. | 123/525 |
| 7,712,451 B2 * | 5/2010 | Hung et al. | 123/431 |
| 7,717,088 B2 * | 5/2010 | Thomas | 123/478 |
| 7,822,530 B2 * | 10/2010 | Shinagawa et al. | 701/103 |
| 7,832,381 B2 * | 11/2010 | Pott et al. | 123/525 |
| 7,845,334 B2 * | 12/2010 | Lippa et al. | 123/431 |
| 7,853,397 B2 * | 12/2010 | Pott et al. | 701/103 |
| 7,899,601 B2 * | 3/2011 | Yun et al. | 701/103 |
| 7,913,675 B2 * | 3/2011 | Bailey et al. | 123/568.21 |
| 7,946,273 B2 * | 5/2011 | Lippa et al. | 123/431 |
| 8,028,676 B2 * | 10/2011 | Ancimer et al. | 123/299 |
| 8,095,294 B1 * | 1/2012 | Griffiths et al. | 701/103 |
| 8,099,230 B2 * | 1/2012 | Wermuth et al. | 701/111 |
| 8,100,093 B2 * | 1/2012 | Morgenstern | 123/3 |
| 8,118,014 B2 * | 2/2012 | Lippa et al. | 123/575 |
| 8,180,556 B2 * | 5/2012 | Cippitani | 701/104 |
| 8,196,567 B2 * | 6/2012 | Pursifull et al. | 123/495 |
| 8,224,559 B2 | 7/2012 | Chang et al. | |
| 8,267,064 B2 * | 9/2012 | Martin et al. | 123/299 |
| 8,290,686 B2 | 10/2012 | Kang et al. | |
| 8,342,158 B2 * | 1/2013 | Ulrey et al. | 123/525 |
| 8,347,862 B2 * | 1/2013 | Pursifull | 123/478 |
| 8,396,644 B2 * | 3/2013 | Kabashima et al. | 701/103 |
| 8,413,643 B2 * | 4/2013 | Pursifull et al. | 123/559.1 |
| 8,459,576 B2 * | 6/2013 | Kim et al. | 239/585.1 |
| 8,662,024 B2 * | 3/2014 | Leone | 123/3 |
| 8,755,989 B2 * | 6/2014 | Surnilla et al. | 701/105 |
| 2002/0007816 A1 * | 1/2002 | Zur Loye et al. | 123/295 |
| 2002/0026926 A1 * | 3/2002 | Loye et al. | 123/435 |
| 2002/0195088 A1 * | 12/2002 | Oprea | 123/525 |
| 2003/0168037 A1 * | 9/2003 | zur Loye et al. | 123/295 |
| 2003/0221661 A1 * | 12/2003 | Willi et al. | 123/299 |
| 2004/0025831 A1 * | 2/2004 | Landi et al. | 123/304 |
| 2004/0103860 A1 * | 6/2004 | zur Loye et al. | 123/27 R |
| 2004/0118116 A1 * | 6/2004 | Beck et al. | 60/601 |
| 2004/0149255 A1 * | 8/2004 | zur Loye et al. | 123/295 |
| 2005/0000485 A1 * | 1/2005 | Kuo et al. | 123/299 |
| 2005/0178360 A1 | 8/2005 | Satou | |
| 2006/0047406 A1 * | 3/2006 | Chatfield et al. | 701/104 |
| 2006/0096577 A1 | 5/2006 | Araki | |
| 2007/0000456 A1 * | 1/2007 | Wong | 123/27 GE |
| 2007/0119421 A1 * | 5/2007 | Lewis et al. | 123/431 |
| 2007/0234976 A1 * | 10/2007 | Dearth et al. | 123/2 |
| 2008/0127950 A1 * | 6/2008 | Malm | 123/527 |
| 2009/0120385 A1 * | 5/2009 | Munshi et al. | 123/3 |
| 2009/0133379 A1 * | 5/2009 | Mendoza et al. | 60/39.281 |
| 2009/0229565 A1 | 9/2009 | Kang et al. | |
| 2009/0254263 A1 * | 10/2009 | Shimizu | 701/104 |
| 2009/0272363 A1 * | 11/2009 | Yun et al. | 123/295 |
| 2009/0320790 A1 * | 12/2009 | Lewis et al. | 123/299 |
| 2010/0024770 A1 * | 2/2010 | Pursifull et al. | 123/446 |
| 2010/0024771 A1 * | 2/2010 | Bidner et al. | 123/446 |
| 2010/0024789 A1 * | 2/2010 | Lippa et al. | 123/672 |
| 2010/0030451 A1 * | 2/2010 | Lippa et al. | 701/104 |
| 2010/0043746 A1 * | 2/2010 | Hartmann et al. | 123/299 |
| 2010/0131177 A1 * | 5/2010 | Pott et al. | 701/103 |
| 2010/0131178 A1 * | 5/2010 | Pott et al. | 701/103 |
| 2010/0199948 A1 * | 8/2010 | Rogak et al. | 123/304 |
| 2011/0094593 A1 * | 4/2011 | Malm | 137/2 |
| 2011/0178693 A1 | 7/2011 | Chang et al. | |
| 2011/0288738 A1 * | 11/2011 | Donnelly et al. | 701/99 |
| 2012/0103306 A1 * | 5/2012 | Livshits et al. | 123/429 |
| 2012/0180766 A1 * | 7/2012 | Malm | 123/518 |
| 2013/0046452 A1 * | 2/2013 | Moscherosch et al. | 701/103 |
| 2013/0046453 A1 * | 2/2013 | Cowgill | 701/104 |
| 2013/0174800 A1 * | 7/2013 | Malm | 123/1 A |

FOREIGN PATENT DOCUMENTS

| | | | | |
|---|---|---|---|---|
| CN | 102027220 A | | 4/2011 | |
| CN | 102135043 A | | 7/2011 | |
| DE | 102007025076 A1 * | | 12/2008 | F02D 41/00 |
| EP | 1555416 A1 | | 7/2005 | |
| RU | 2292477 C1 | | 1/2007 | |
| RU | 2347926 C1 | | 2/2009 | |
| SU | 1554775 A3 | | 3/1990 | |
| WO | WO 9404817 A1 * | | 3/1994 | |
| WO | WO2010/089568 A1 | | 8/2010 | |
| WO | WO 2010089568 A1 * | | 8/2010 | F02D 41/00 |
| WO | WO 2013025833 A1 * | | 2/2013 | |
| WO | WO 2013025835 A1 * | | 2/2013 | |

OTHER PUBLICATIONS

Written Opinion of the International Searching Authority, for International Application No. PCT/US2012/050993, mailed Oct. 18, 2012.
Written Opinion of the International Searching Authority, for International Application No. PCT/US2012/050990, mailed Oct. 18, 2012.
Written Opinion of the International Searching Authority, for International Application No. PCT/US2012/050986, mailed Nov. 15, 2012.
U.S. Appl. No. 13/324,502, filed Dec. 13, 2011, Cowgill.
U.S. Appl. No. 13/324,564, filed Dec. 13, 2011, Moscherosch et al.
"Driveline Release Coordination with Negative Crankshaft Torque," Research Disclosure Database No. 562059; Feb. 2011; 2 Pages.

* cited by examiner

SYSTEM AND METHOD FOR ADJUSTING FUEL MASS FOR MINIMUM FUEL INJECTOR PULSE WIDTHS IN MULTIPLE FUEL SYSTEM ENGINES

CROSS-REFERENCE TO RELATED APPLICATIONS

This application claims the benefit of U.S. Provisional Application No. 61/523,677, filed on Aug. 15, 2011. The disclosure of the above application is incorporated herein by reference in its entirety.

This application is related to U.S. patent application Ser. No. 13/324,502, filed on Dec. 13, 2011, which claims the benefit of U.S. Provisional Application No. 61/523,663, filed on Aug. 15, 2011 and Ser. No. 13/324,564, filed on Dec. 13, 2011, which claims the benefit of U.S. Provisional Application No. 61/523,690 filed on Aug. 15, 2011. The disclosure of the above applications is incorporated herein by reference in their entirety.

FIELD

The present disclosure relates to internal combustion engines, and more particularly to a system and method for adjusting fuel mass for minimum fuel injector pulse widths in engines having multiple fuel systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders. Fuel is injected into the engine via a plurality of fuel injectors and combined with the air to create an air/fuel (A/F) mixture. The fuel injectors may inject the fuel into the engine either via intake ports of the cylinders, respectively (port fuel injection), or directly into the cylinders, respectively (direct fuel injection). The A/F mixture is compressed by pistons within the cylinders, respectively, and combusted, which drives the pistons and rotatably turns a crankshaft generating drive torque. The drive torque may then be transferred to a driveline of a vehicle via a transmission.

SUMMARY

A control system for an engine includes a fuel mass determination module, a mass fraction determination module, and a fuel injector control module. The fuel mass determination module determines a first minimum fuel mass corresponding to a first fuel system of the engine. The mass fraction determination module determines first minimum and maximum mass fractions based on the first minimum fuel mass and a total fuel mass. The fuel injector control module limits a first desired mass fraction based on the first minimum and maximum mass fractions, and controls a first fuel injector of the engine based on the limited first desired mass fraction.

A method for controlling an engine includes determining a first minimum fuel mass corresponding to a first fuel system of the engine, determining first minimum and maximum mass fractions based on the first minimum fuel mass and a total fuel mass, limiting a first desired mass fraction based on the first minimum and maximum mass fractions, and controlling a first fuel injector of the engine based on the limited first desired mass fraction.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
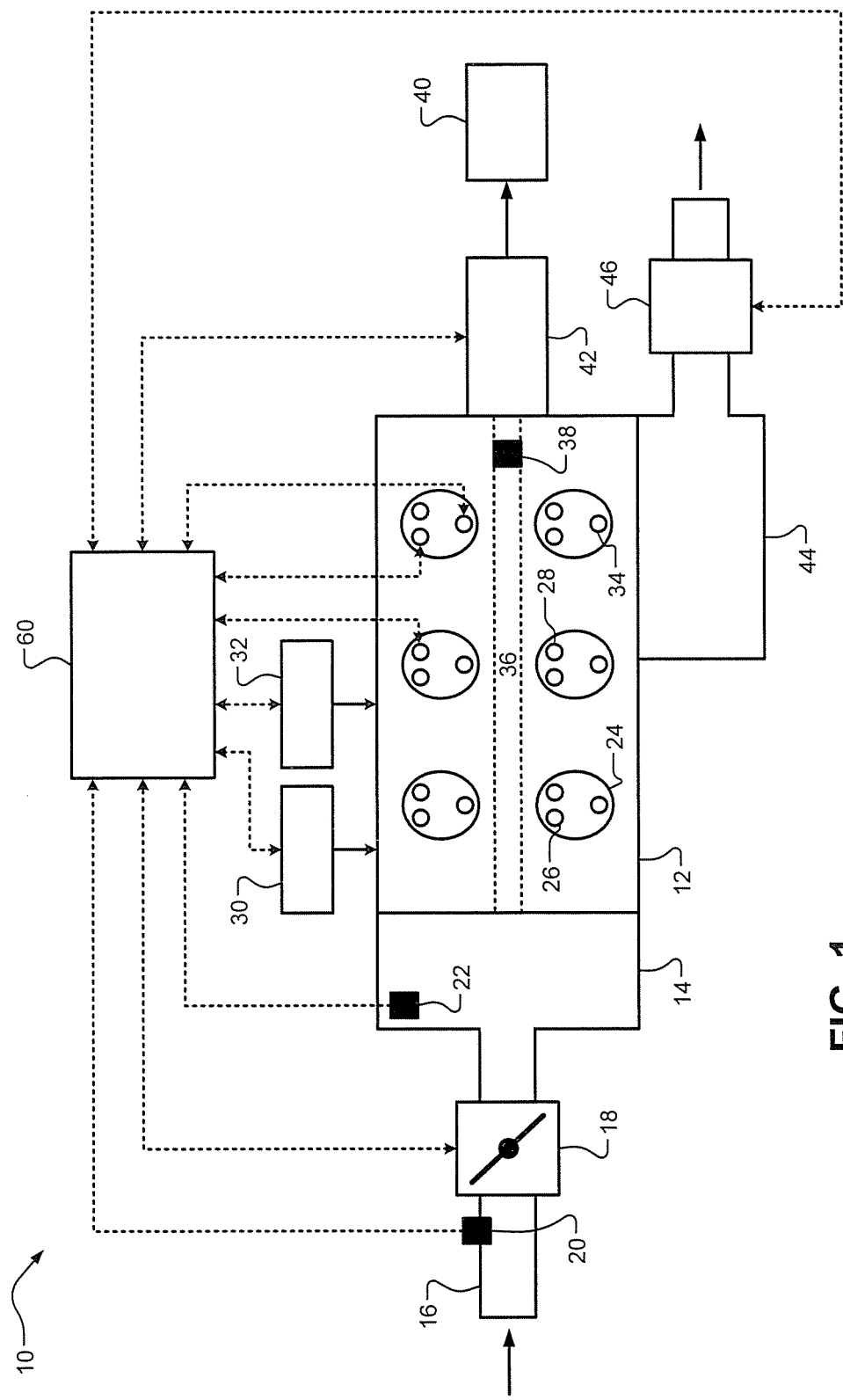
FIG. 1 is a functional block diagram of an example engine system having multiple fuel systems according to some implementations of the present disclosure.

Fuel control systems may control fuel injectors based on one or more of a plurality of operating parameters. More specifically, pulse widths and/or frequency of fuel injector control signals may vary based on operating parameters such as engine speed or engine load. Another operating parameter may be a minimum pulse width for the fuel injectors. The minimum pulse width refers to a minimum period that each of the fuel injectors is open at a given time (for an injection event). Operating the fuel injectors at less than the minimum pulse width may cause significant variations in the mass of fuel injected by the fuel injectors.

Engines having multiple fuel systems (multi-fuel engines) may include engines configured for different points (locations) of fuel injection and/or for injection of different fuels. For example, a multi-fuel engine may have first and second pluralities of fuel injectors for selectively injecting fuel via intake ports of cylinders of the engine (port fuel injection) or directly into the cylinders of the engine (direct fuel injection), respectively. Additionally or alternatively, a multi-fuel engine may have first and second fuel systems for selectively injecting a first fuel and/or a second fuel into the engine, the first fuel being different than the second fuel (e.g., gasoline and compressed natural gas, or CNG, respectively).

For example, bi-fuel operation includes injecting either the first or the second fuel into the engine during a combustion cycle. In contrast, for example, co-fueling operation (or multi-fuel operation) includes injecting both the first and second fuels into the engine during a combustion cycle (e.g., via the first and second pluralities of fuel injectors, respectively). Depending on operating conditions, a particular fuel may be desirable. For example only, in a gasoline/CNG implementation, gasoline may be preferred for high engine loads whereas CNG may be preferred for low engine loads.

The minimum pulse width for fuel injectors in an engine, however, may vary depending on the point (location) of fuel injection and/or the type of fuel being injected. As previously mentioned, operating fuel injectors at less than the minimum pulse width may result in a significant variation in injected fuel mass, which may increase emissions and/or cause combustion problems such as misfires.

Accordingly, a system and method are presented for adjusting fuel mass for minimum fuel injector pulse widths in engines having multiple fuel systems (multi-fuel engines). The system and method may first determine whether to use the fuel injector flow rates to calculate the minimum fuel masses. If fuel injector flow rates are being used, the system and method may determine a minimum fuel mass based on minimum fuel injector pulse width and a flow rate of the fuel injector. The fuel injector flow rate may be either measured or modeled. If fuel injector flow rates are not being used, the system and method may determine a minimum fuel mass based on air-per-cylinder (APC) and engine speed (e.g., a mapping stored in a look-up table).

For example, the system and method may determine a minimum fuel mass for each fuel system. The minimum fuel mass for each fuel system represents a minimum amount of fuel that may be delivered by each fuel system, respectively. The minimum fuel masses for each fuel system may be important for particular operating conditions, such as low engine load. For example only, in a gasoline/CNG implementation, the system and method may minimize gasoline usage; the minimum amount of gasoline that may be injected without violating minimum injector pulse widths may be determined, and additional CNG fuel may be provided by the other fuel system (as required).

The system and method may determine minimum and maximum mass fractions based on each determined minimum fuel mass. More specifically, the system and method may determine the minimum and maximum mass fractions based on each determined minimum fuel mass and a total fuel mass. The total fuel mass may be based on operating parameters such as APC, target air/fuel (A/F) ratio, etc. The system and method may then limit a desired mass fraction based on the determined minimum and maximum mass fractions.

The desired mass fraction may be based on a plurality of different operating parameters, such as minimizing consumption of a particular fuel (e.g., gasoline) as previously described. More specifically, the system and method may limit the desired mass fraction to a range between the minimum and maximum mass fractions. The system and method may then control fuel injection (the fuel injector) based on the limited desired mass fraction. For example only, the system and method may perform co-fueling (e.g., gasoline and CNG) based on the limited desired mass fraction.

Referring now to FIG. 1, an example of an engine system 10 is shown. The engine system 10 includes an engine 12 that generates drive torque to propel a vehicle. For example, the engine 12 may be a spark ignition (SI) engine, a compression ignition (CI) engine (e.g., a diesel engine), a homogeneous charge compression ignition (HCCI) engine, or another suitable type of engine. Additionally, in some implementations, the engine system 10 may be a hybrid system and therefore may include additional components such as a battery system and an electric motor.

The engine 12 draws air into an intake manifold 14 through an induction system 16 that may be regulated by a throttle 18. For example, the throttle 18 may be electrically controlled via electronic throttle control (ETC). A mass air flow (MAF) sensor 20 measures a rate of airflow through the induction system 16 and into the intake manifold 14. A manifold absolute pressure (MAP) sensor 22 measures a pressure of air within the intake manifold 14. The air in the intake manifold 14 is distributed to a plurality of cylinders 24. While six cylinders are shown, the engine 12 may include other numbers of cylinders.

The engine system 10 further includes first and second pluralities of fuel injectors 26 and 28, respectively. The first and second pluralities of fuel injectors 26, 28 may selectively provide fuel to the engine 12 at different points (locations) and/or may selectively provide different fuels to the engine 12. The different points (locations) may include intake ports of the cylinders 24, respectively (port fuel injection), or directly into the cylinders 24, respectively (direct fuel injection). For example, the first plurality of fuel injectors 26 may inject fuel directly into the cylinders 24, respectively, and the second plurality of fuel injectors 28 may inject fuel via the intake ports of the cylinders 24, respectively.

The different fuels may include gasoline, diesel, CNG, liquefied natural gas (LNG), liquefied petroleum gas (LPG), hydrogen, or other suitable fuels. For example only, the first plurality of fuel injectors 26 may selectively provide gasoline directly into the cylinders 24 (direct fuel injection) and the second plurality of fuel injectors may selectively provide CNG or LPG via intake ports of the cylinders (port fuel injection). Other combinations of fuel injector location in the engine 12 and fuel supplied to the engine 12, however, may be implemented.

The engine system 10 may further include first and second fuel systems 30 and 32, respectively. For example, each of the first and second fuel systems 30 and 32 may include components such as tanks, pumps, fuel rails, regulators, valves, and the like. While two fuel systems 30 and 32 are shown, the engine system 10 may include additional fuel systems. The first fuel system 30 may supply a first fuel to the engine 12. For example, the first fuel system 30 may selectively provide the first fuel to the engine 12 via the first plurality of fuel injectors 26. For example, the first fuel may be gasoline. For example only, however, the first fuel may be another suitable liquid fuel such as diesel.

Similarly, the second fuel system may supply a second fuel to the engine 12. For example, the second fuel system 32 may selectively provide the second fuel to the engine 12 via the second plurality of fuel injectors 28. For example only, the second fuel may be CNG, LNG, LPG, hydrogen, or another suitable gaseous fuel. In bi-fuel operation, only one of the pluralities of fuel injectors 26, 28 and/or one of the fuel systems 30, 32 may supply fuel to the engine 12 at a given time (e.g., liquid fuel or gaseous fuel). In multi-fuel operation, however, both of the fuel systems 30, 32 may supply fuel via the first and second fuel injectors 26, 28, respectively.

The injected fuel mixes with the air to create an A/F mixture. The A/F mixture is compressed within each the cylinders 24 using pistons (not shown) and combusted to drive the pistons and generate drive torque. A plurality of spark plugs 34 may be used to ignite the compressed A/F mixture. Depending on the type of engine 12, however, the A/F mixture may be combusted via other suitable methods (e.g., autoignition). The drive torque generated by combustion rotatably turns a crankshaft 36. A crankshaft position sensor 38 measures a rotational position of the crankshaft 36. For example, the measured crankshaft position may be used to determine engine speed.

Drive torque at the crankshaft 36 is transferred to a driveline 40 of the vehicle via a transmission 42. For example, the transmission 42 may be coupled to the crankshaft 36 via a fluid coupling such as a torque converter. Exhaust gas resulting from combustion is expelled from the cylinders 24 into an exhaust manifold 44. The exhaust gas in the exhaust manifold 44 is treated by an exhaust treatment system 46 before being released into the atmosphere. For example, the exhaust treatment system 46 may include at least one of an oxidation catalyst (OC), nitrogen oxide (NOx) adsorbers/absorbers, a selective catalytic reduction (SCR) system, a particulate matter (PM filter), and a three-way catalytic converter.

A control module 60 controls operation of the engine system 10. The control module 60 receives signals from the throttle 18, the MAF sensor 20, the MAP sensor 22, the fuel injectors 26, the second fuel injectors 28, the first fuel system 30, the second fuel system 32, the spark plugs 34, the transmission 42, and/or the exhaust treatment system 46. The control module 60 controls the throttle 18, the fuel injectors 26, the second fuel injectors 28, the first fuel system 30, the second fuel system 32, the spark plugs 34, the transmission 42, and/or the exhaust treatment system 46. The control module 60 may also implement the system or method according to some embodiments of the present disclosure.

Figure 2:
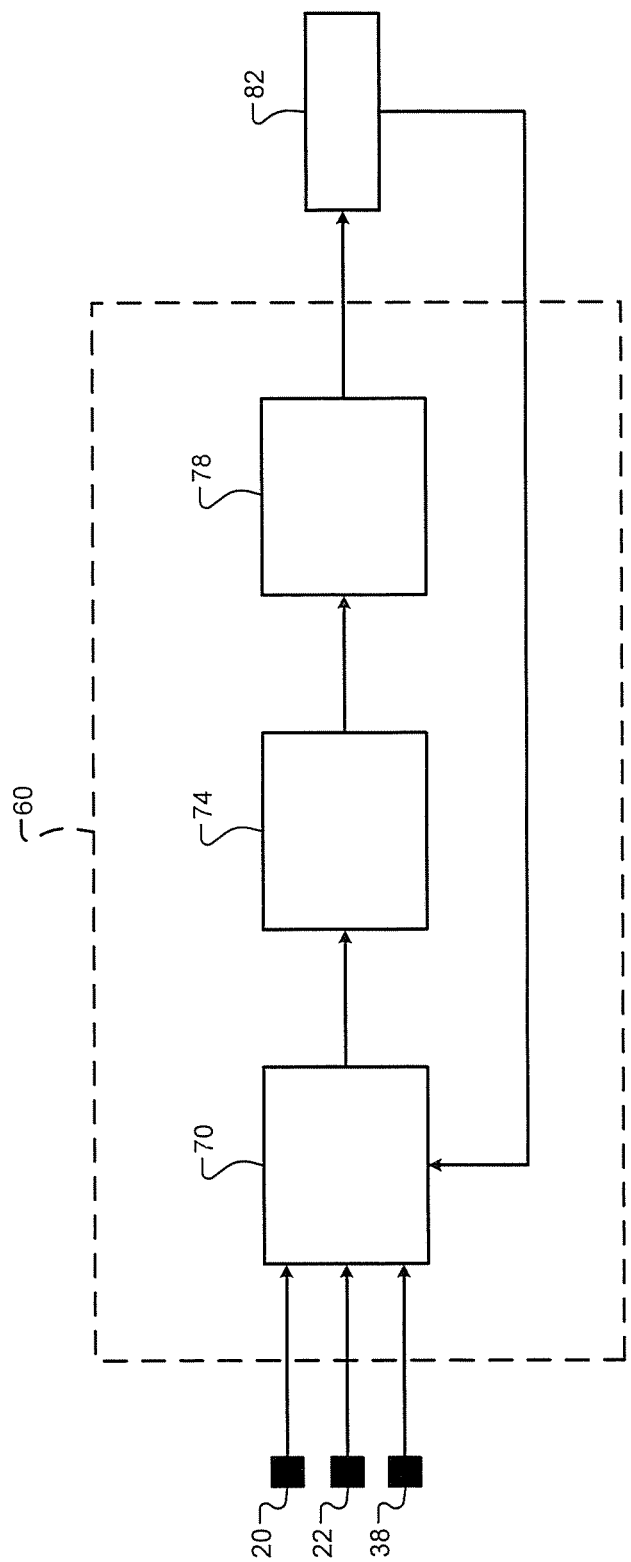
FIG. 2 is a functional block diagram of an example control module according to some implementations of the present disclosure.

Referring now to FIG. 2, an example of the control module 60 is shown. The control module 60 may include a fuel mass determination module 70, a mass fraction determination module 74, and a fuel injector control module 78. The control module 60 controls a fuel injector 82. The fuel injector 82 may be one of the first and second pluralities of fuel injectors 26 and 28, respectively. While a single fuel injector 82 is referred to, the control module 60 may similarly control a remainder of the first and/or second pluralities of fuel injectors 26 and 28, respectively.

The fuel mass determination module 70 determines a minimum fuel mass to be injected into the engine 12. For example, the fuel mass determination module 70 may determine a minimum fuel mass for each of the fuel systems 30, 32. The fuel mass determination module 70 may determine the minimum fuel mass based on (i) APC and engine speed and/or (ii) the minimum fuel injector pulse width and a flow rate of the fuel injector 82.

Rather, the fuel mass determination module 70 may first determine whether fuel injector flow rate is being used for minimum fuel mass calculations. If fuel injector flow rate is not being used, then the fuel mass determination module 70 may determine the minimum fuel mass based on APC and engine speed. If fuel injector flow rate is being used, then the fuel mass determination module 70 may determine the minimum fuel mass based on the minimum pulse width of the fuel injector 82 and the flow rate of the fuel injector 82.

The fuel mass determination module 70 may determine the APC based on MAP and engine speed, which are measured by the MAP sensor 22 and the crankshaft position sensor 38, respectively. The APC may further be based on engine airflow, which is measured by the MAF sensor 20. The flow rate of the fuel injector 82 may be either measured by a flow rate sensor (not shown) or estimated using a flow rate model. The mass fraction determination module 74 determines minimum and maximum mass fractions for fuel injection. More specifically, the mass fraction determination module 74 may determine the minimum and mass fractions for fuel injection based on the determined minimum fuel mass and a total fuel mass. For example, the total fuel mass may be based on APC.

The fuel injector control module 78 controls the fuel injector 82. The fuel injector control module 78 may control the fuel injector 82 based on a desired mass fraction and the determined minimum and maximum mass fractions. More specifically, the fuel injector control module 78 limits the desired mass fraction based on the determined minimum and maximum mass fractions. In other words, the fuel injector control module 78 may limit the desired mass fraction to a range between the minimum and maximum mass fractions. The fuel injector control module 78 may then control fuel injection (the fuel injector 82) based on the limited desired mass fraction.

Figure 3:
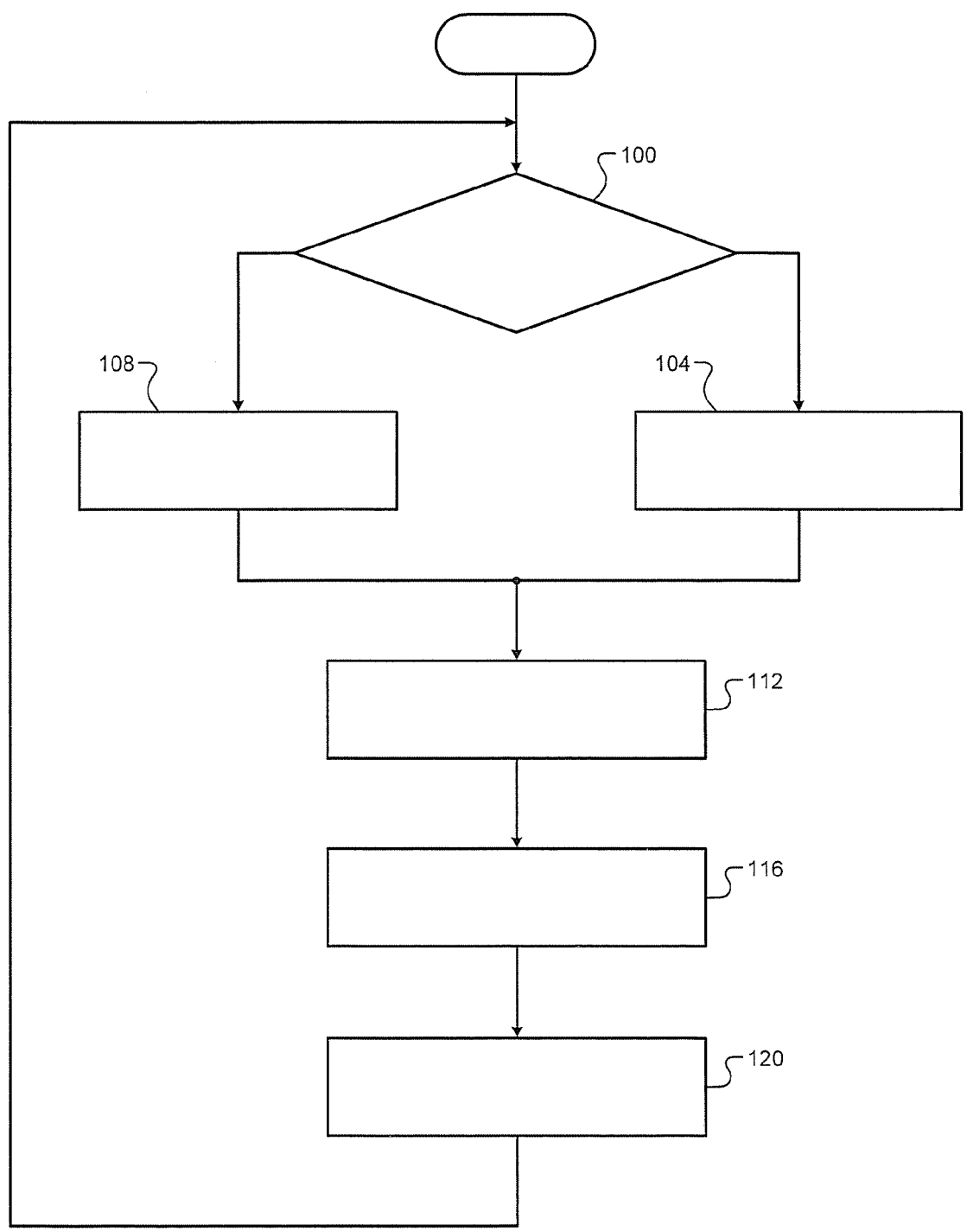
FIG. 3 is a flow diagram of an example method for adjusting fuel mass for minimum fuel injector pulse widths in an engine having multiple fuel systems according to some implementations of the present disclosure.

Referring now to FIG. 3, an example of a method for adjusting minimum fuel injector pulse widths in dual fuel engines begins at 100. At 100, the control module 60 determines whether fuel injector flow rates are being used to calculate the minimum fuel masses. If true, control may proceed to 104. If false, control may proceed to 108. At 104, the control module 60 determines a minimum fuel mass based on a minimum pulse width of the fuel injector 82 and a flow rate of the fuel injector 82. Control may then proceed to 112. At 108, the control module 60 determines a minimum fuel mass based on APC and engine speed. Control may then proceed to 112. For example, the control module 60 may determine minimum fuel masses for each fuel system 30, 32 (fuel injectors 26 and 28, respectively).

At 112, the control module 60 may determine minimum and maximum mass fractions based on the determined minimum fuel mass and a total fuel mass. For example, the total fuel mass may be based on operating parameters such as APC, target A/F ratio, etc. At 116, the control module 60 may limit a desired mass fraction based on the determined minimum and maximum mass fractions. In other words, the control module 60 may limit the desired mass fraction to a range between the determined minimum and maximum mass fractions. At 120, the control module 60 may control fuel injection (fuel injector 82) based on the limited desired mass fraction. Control may then end or return to 100 for additional cycles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A control system for an engine, the control system comprising:
   a fuel mass determination module configured to, independent of a position of a throttle of the engine, determine a first minimum fuel mass that is capable of being delivered by a first fuel system of the engine based on either (i) an amount of air per cylinder of the engine and a speed of the engine, or (ii) a first minimum pulse width of a first fuel injector of a cylinder of the engine and a flow rate of the first fuel injector,
   wherein
      the engine comprises the first fuel system, a second fuel system, and a plurality of fuel injectors,
      the plurality of fuel injectors have respective minimum pulse widths,
      the minimum pulse widths include the first minimum pulse width,
      each of the minimum pulse widths is (i) based on a respective point of injection and a type of fuel injected by a corresponding one of the plurality of fuel injectors, and (ii) refers to a minimum ON time per injection of a corresponding one of the plurality of fuel injectors,
      the plurality of fuel injectors comprise the first fuel injector;
   a mass fraction determination module that determines first minimum and maximum mass fractions based on the first minimum fuel mass and a total fuel mass for the cylinder of the first fuel injector; and
   a fuel injector control module that (i) limits a first mass fraction to be greater than the first minimum mass fraction and less than the first maximum mass fraction, and (ii) controls the first fuel injector of the engine based on the limited first mass fraction such that an actual fuel injector pulse width of the first fuel injector is greater than or equal to the corresponding one of the minimum pulse widths.

2. The control system of claim 1, wherein the fuel mass determination module further determines a second minimum fuel mass corresponding to the second fuel system of the engine based on either (i) the amount of air per cylinder of the engine and the speed of the engine, or (ii) a minimum pulse width of a second fuel injector of the cylinder of the first fuel injector and a flow rate of the second fuel injector.

3. The control system of claim 2, wherein the mass fraction determination module further determines second minimum and maximum mass fractions based on the second minimum fuel mass and the total fuel mass for the cylinder of the first fuel injector.

4. The control system of claim 3, wherein the fuel injector control module further (i) limits a second mass fraction to be greater than the second minimum mass fraction and less than the second maximum mass fraction, and (ii) controls the second fuel injector of the engine based on the limited second mass fraction.

5. The control system of claim 4, wherein:
   the first and second fuel injectors are associated with the first and second fuel systems, respectively;
   the first fuel system provides a first fuel to the first fuel injector;
   the first fuel injector is configured for direct fuel injection;
   the second fuel system provides a second fuel to the second fuel injector;
   the second fuel injector is configured for port fuel injection; and
   the first fuel is gasoline and wherein the second fuel is compressed natural gas (CNG).

6. The control system of claim 2, wherein the fuel mass determination module determines the first and second minimum fuel masses based on the amount of air per cylinder and an engine speed.

7. The control system of claim 6, wherein the fuel mass determination module further includes a lookup table that maps the amount of air per cylinder and an engine speed to the first and second minimum fuel masses.

8. The control system of claim 2, wherein the fuel mass determination module determines:
   the first minimum fuel mass based on the minimum pulse width of the first fuel injector and the flow rate of the first fuel injector; and
   the second minimum fuel mass based on the minimum pulse width of the second fuel injector and the flow rate of the second fuel injector.

9. A method for controlling an engine, the method comprising:
   independent of a position of a throttle of the engine, determining a first minimum fuel mass that is capable of being delivered by a first fuel system of the engine based on either (i) an amount of air per cylinder of the engine and a speed of the engine, or (ii) a first minimum pulse width of a first fuel injector of a cylinder of the engine and a flow rate of the first fuel injector,
   wherein
      the engine comprises the first fuel system, a second fuel system, and a plurality of fuel injectors,
      the plurality of fuel injectors have respective minimum pulse widths,
      the minimum pulse widths include the first minimum pulse width,
      each of the minimum pulse widths is (i) based on a respective point of injection and a type of fuel injected by a corresponding one of the plurality of fuel injectors, and (ii) refers to a minimum ON time per injection of a corresponding one of the plurality of fuel injectors,
      the plurality of fuel injectors comprise the first fuel injector;
   determining first minimum and maximum mass fractions based on the first minimum fuel mass and a total fuel mass for the cylinder of the first fuel injector;
   limiting a first mass fraction to be greater than the first minimum mass fraction and less than the first maximum mass fraction; and
   controlling the first fuel injector of the engine based on the limited first mass fraction such that an actual fuel injector pulse width of the first fuel injector is greater than or equal to the corresponding one of the minimum pulse widths.

10. The method of claim 9, further comprising determining a second minimum fuel mass corresponding to the second fuel system of the engine based on either (i) the amount of air per cylinder of the engine and the speed of the engine, or (ii)

a minimum pulse width of a second fuel injector of the cylinder of the first fuel injector and a flow rate of the second fuel injector.

11. The method of claim 10, further comprising determining second minimum and maximum mass fractions based on the second minimum fuel mass and the total fuel mass for the cylinder of the first fuel injector.

12. The method of claim 11, further comprising:
limiting a second mass fraction to be greater than the second minimum mass fraction and less than the second maximum mass fraction; and
controlling the second fuel injector of the engine based on the limited second mass fraction.

13. The method of claim 12, wherein:
the first and second fuel injectors are associated with the first and second fuel systems, respectively;
the first fuel system provides a first fuel to the first fuel injector;
the first fuel injector is configured for direct fuel injection;
the second fuel system provides a second fuel to the second fuel injector;
the second fuel injector is configured for port fuel injection; and
the first fuel is gasoline and wherein the second fuel is compressed natural gas (CNG).

14. The method of claim 10, further comprising determining the first and second minimum fuel masses based on the amount of air per cylinder and an engine speed.

15. The method of claim 14, further comprising using a lookup table that maps the amount of air per cylinder and an engine speed to the first and second minimum fuel masses.

16. The method of claim 10, further comprising determining:
the first minimum fuel mass based on the minimum pulse width of the first fuel injector and the flow rate of the first fuel injector; and
the second minimum fuel mass based on the minimum pulse width of the second fuel injector and the flow rate of the second fuel injector.

17. The control system of claim 1, wherein:
the first minimum mass fraction is the first minimum fuel mass divided by the total fuel mass of the cylinder of the first fuel injector;
the first maximum mass fraction is a first maximum fuel mass divided by the total fuel mass of the cylinder of the first fuel injector; and
the first limited mass fraction is a mass of a first fuel provided via the first fuel injector divided by the total fuel mass.

18. The control system of claim 3, wherein the mass fraction determination module is configured to determine the total fuel mass based on the amount of air per cylinder and an air/fuel ratio.

19. The control system of claim 4, wherein:
the first minimum mass fraction is the first minimum fuel mass divided by the total fuel mass of the cylinder of the first fuel injector;
the first maximum mass fraction is a first maximum fuel mass divided by the total fuel mass of the cylinder of the first fuel injector;
the first limited mass fraction is a mass of a first fuel provided via the first fuel injector divided by the total fuel mass;
the second minimum mass fraction is the second minimum fuel mass divided by the total fuel mass of the cylinder of the first fuel injector;
the second maximum mass fraction is a second maximum fuel mass divided by the total fuel mass of the cylinder of the first fuel injector;
the second limited mass fraction is a mass of a second fuel provided via the second fuel injector divided by the total fuel mass; and
the total fuel mass is equal to a sum of the mass of the first fuel and the mass of the second fuel.

20. The control system of claim 4, wherein the fuel injector control module is configured to (i) minimize the limited first mass fraction while not reducing a pulse width of the first fuel injector to less than the minimum pulse width of the first fuel injector, and (ii) compensate for the minimizing of the limited first mass fraction by increasing the limited second mass fraction such that the total fuel mass is provided to the cylinder of the first fuel injector.

* * * * *